(12) United States Patent
Jeong et al.

(10) Patent No.: US 11,456,488 B2
(45) Date of Patent: Sep. 27, 2022

(54) ALL SOLID TYPE THREE-DIMENSIONAL BATTERY AND METHOD OF MANUFACTURING THE SAME

(71) Applicant: SAMSUNG ELECTRONICS CO., LTD., Suwon-si (KR)

(72) Inventors: Huisu Jeong, Suwon-si (KR); Hwiyeol Park, Ansan-si (KR); Kyounghwan Kim, Seoul (KR); Hojung Yang, Suwon-si (KR); Sungjin Lim, Suwon-si (KR); Jin S. Heo, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/015,622

(22) Filed: Sep. 9, 2020

(65) Prior Publication Data

US 2021/0013548 A1 Jan. 14, 2021

Related U.S. Application Data

(63) Continuation of application No. 15/493,764, filed on Apr. 21, 2017, now Pat. No. 10,804,570.

(30) Foreign Application Priority Data

Sep. 28, 2016 (KR) .................. 10-2016-0124811

(51) Int. Cl.
*H01M 10/0585* (2010.01)
*H01M 10/052* (2010.01)
*H01M 10/0562* (2010.01)
*H01M 10/058* (2010.01)

(52) U.S. Cl.
CPC ..... *H01M 10/0585* (2013.01); *H01M 10/052* (2013.01); *H01M 10/058* (2013.01); *H01M 10/0562* (2013.01)

(58) Field of Classification Search
CPC ............ H01M 4/02; H01M 4/36; H01M 4/70; H01M 4/64; H01M 10/0585; H01M 10/052; H01M 10/0562
See application file for complete search history.

(56) References Cited

U.S. PATENT DOCUMENTS

| 7,241,533 | B1 | 7/2007 | Ikeda et al. |
| 7,527,897 | B2 | 5/2009 | Nathan et al. |
| 8,999,571 | B2 | 4/2015 | Chiang et al. |
| 2003/0082446 | A1 | 5/2003 | Chiang et al. |

(Continued)

FOREIGN PATENT DOCUMENTS

JP 2015210970 A 11/2015

*Primary Examiner* — Kenneth J Douyette
(74) *Attorney, Agent, or Firm* — Cantor Colburn LLP (57) ABSTRACT

An all solid type three-dimensional ("3D") battery may include a cathode collector, a cathode structure in contact with the cathode collector, an electrolyte structure in contact with the cathode structure, an anode structure in contact with the electrolyte structure, the anode structure not being in contact with the cathode structure and the cathode collector, and an anode collector in contact with the anode structure, where the electrolyte structure is in contact with the cathode collector around the cathode structure. An entirety of a surface of the cathode structure which is used for a battery operation may be in contact with the cathode collector and the electrolyte structure.

10 Claims, 8 Drawing Sheets (56) References Cited

U.S. PATENT DOCUMENTS

| | | |
|---|---|---|
| 2003/0232248 A1 | 12/2003 | Iwamoto et al. |
| 2008/0153000 A1* | 6/2008 | Salot .................... H01M 4/134 |
| | | 429/218.1 |
| 2010/0028775 A1* | 2/2010 | Emura .................... H01M 6/40 |
| | | 429/209 |
| 2010/0035152 A1 | 2/2010 | Sastry et al. |
| 2010/0227228 A1 | 9/2010 | Yamazaki et al. |
| 2011/0171518 A1 | 7/2011 | Dunn et al. |
| 2014/0272547 A1* | 9/2014 | Ramasu ............. H01M 10/052 |
| | | 429/163 |
| 2014/0370347 A1 | 12/2014 | Jung et al. |
| 2015/0207171 A1 | 7/2015 | Chang et al. |
| 2016/0149170 A1 | 5/2016 | Asai et al. |

\* cited by examiner

ALL SOLID TYPE THREE-DIMENSIONAL BATTERY AND METHOD OF MANUFACTURING THE SAME

This application is a continuation of U.S. patent application Ser. No. 15/493,764, now U.S. Pat. No. 10,804,570, filed on Apr. 21, 2017, which claims priority to Korean Patent Application No. 10-2016-0124811, filed on Sep. 28, 2016, and all the benefits accruing therefrom under 35 U.S.C. § 119, the content of which in its entirety is herein incorporated by reference.

BACKGROUND

1. Field

Embodiments of the disclosure relate to a battery, and more particularly, to an all solid type three-dimensional ("3D") battery and a method of manufacturing the same.

2. Description of the Related Art

A conventional battery generally includes a separator and a liquid type electrolyte. As demand for batteries having high stability and capacity increases, a battery including a gel type polymer electrolyte has been developed. Recently, an all solid type three-dimensional ("3D") battery having enhanced stability and high capacity has been introduced. The all solid 3D battery has a structure in which an active material fraction with respect to a fixed volume is high. Accordingly, an energy density of the all solid 3D battery may be larger in comparison with that of a two-dimensional ("2D") battery having a generally flat structure.

SUMMARY

Provided is an all solid type three-dimensional ("3D") battery of which initial charging operation may be smoothly performed at the time of charging.

Provided is a method of manufacturing the all solid type 3D battery.

Additional embodiments will be set forth in part in the description which follows and, in part, will be apparent from the description, or may be learned by practice of the presented embodiments.

According to an embodiment, an all solid type 3D battery may include a first collector, a first structure in contact with the first collector, an electrolyte structure in contact with the first structure, an anode structure in contact with the electrolyte structure, the anode structure separated from the first structure and the first collector, and an anode collector in contact with a portion of an upper surface of the anode structure, where the remaining portion of the upper surface of the second structure and the second collector are spaced apart from each other in a direction perpendicular to a plane extension direction of the second collector.

In an embodiment, in the all solid type 3D battery, a portion of the first collector may be in contact with a portion of a side surface of the first structure. In this case, a portion of the first collector may be in contact with a portion or an entirety of a side surface of outmost side surfaces of the first structure. In addition, a portion of the first collector may be in contact with a portion or an entirety of each of outmost side surfaces of the first structure.

In an embodiment, the first structure may include a portion parallel to the first collector and a portion perpendicular to the first collector.

In an embodiment, the anode collector may be parallel to the first collector and in contact with an entire top surface of the anode structure.

In an embodiment, the anode collector may include a portion parallel to the first collector and a portion perpendicular to the first collector.

In an embodiment, an entirety of a surface of the first structure which is used for a battery operation may be in contact with the first collector and the electrolyte structure.

According to an embodiment, an all solid type 3D battery may include a first collector, a first structure in contact with the first collector, an electrolyte structure in contact with the first structure, an anode structure in contact with the electrolyte structure, the anode structure not being in contact with the first structure and the first collector, and an anode collector in contact with the anode structure, where the first collector, the first structure and the electrolyte structure are configured for an initial conductive area to be defined at a corner of the first structure when the all solid type 3D battery is charged.

In an embodiment, in the all solid type 3D battery, the corner of the first structure may be in a portion of the first structure parallel to the first collector.

In an embodiment, the corner of the first structure may be in a portion of the first structure perpendicular to the first collector.

In an embodiment, the portion of the first collector may be in contact with a portion of a side surface of the first structure. In addition, a portion of the first collector may be in contact with a portion or an entirety of a side surface of outmost side surfaces of the first structure.

In an embodiment, the portion of the first collector may be in contact with a portion or an entirety of a surface of each of outmost side surfaces of the first structure.

According to an embodiment, a method of manufacturing an all solid type 3D battery may include forming a first collector, forming a first structure on the first collector, forming an electrolyte structure on the first structure, forming an anode structure on the electrolyte structure, and forming an anode collector on the anode structure, where a portion of the electrolyte structure contacts the first collector.

In the method of manufacturing the all solid type 3D battery, the forming the first collector may include contacting a portion of the first collector to at least one side surface of outmost side surfaces of the first structure. In addition, an entirety of a surface of the first structure which is used for the battery operation contacts the first collector and the electrolyte structure.

BRIEF DESCRIPTION OF THE DRAWINGS

These and/or other embodiments will become apparent and more readily appreciated from the following description of the embodiments, taken in conjunction with the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the context clearly indicates otherwise. "At least one" is not to be construed as limiting to "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the drawings are schematic in nature and their shapes are not intended to illustrate the precise shape of a region and are not intended to limit the scope of the claims.

Figure 1:
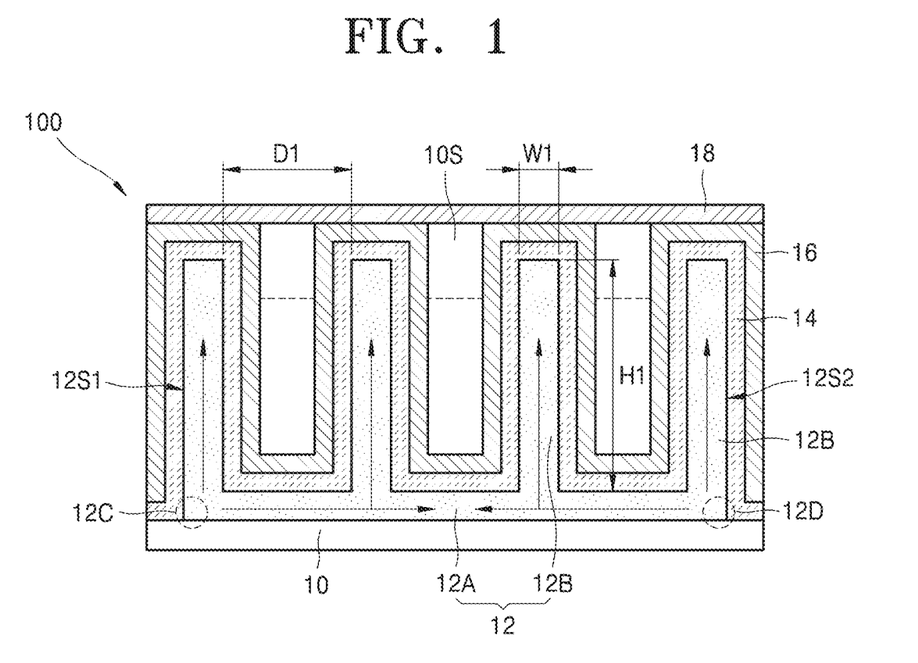
FIG. 1 is a cross-sectional view of an embodiment of an all solid type three-dimensional ("3D") battery.
Figure 2:
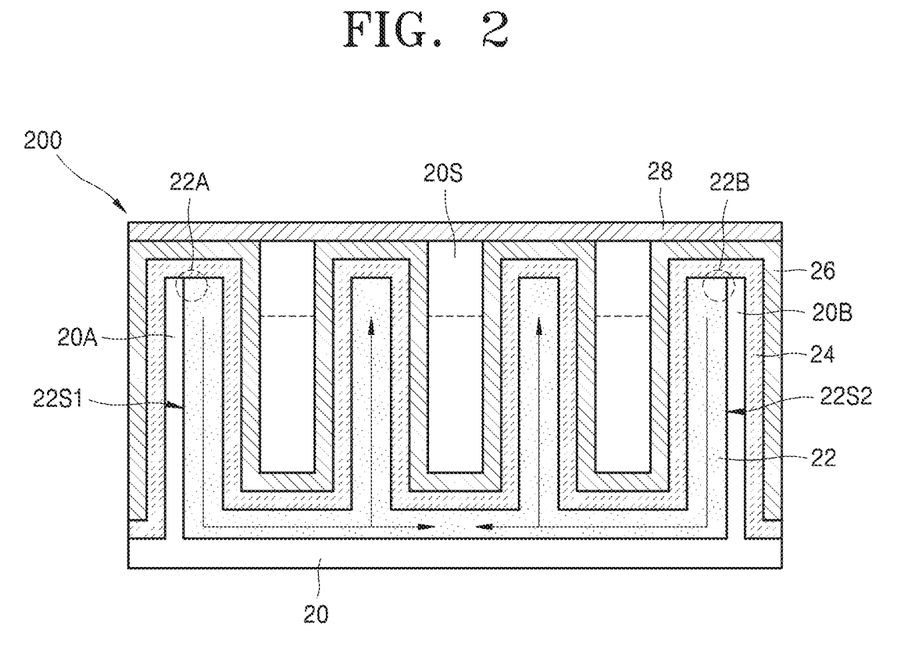
FIG. 2 is a cross-sectional view of an embodiment of an all solid type 3D battery.
Figure 3:
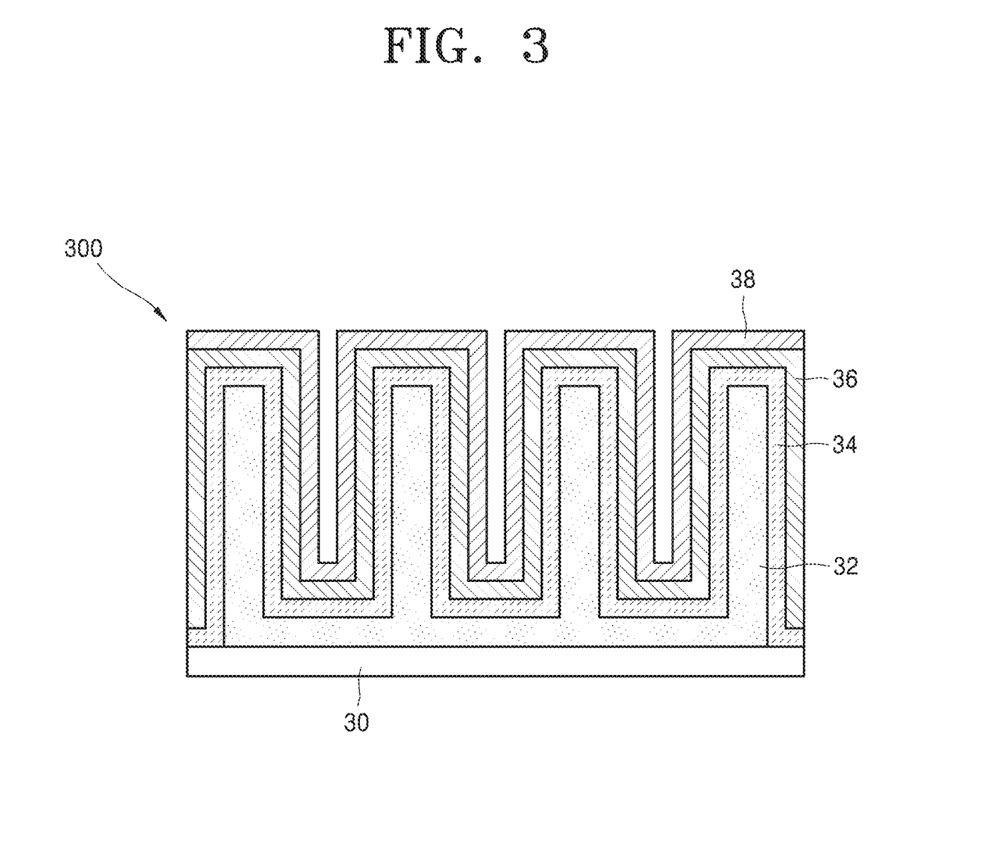
FIG. 3 is a cross-sectional view of an embodiment of an all solid type 3D battery.

Hereinafter, the inventive concept on an all solid type three-dimensional ("3D") battery and a method of manufacturing the same will be described in detail by explaining embodiments of the inventive concept with reference to the attached drawings. Layers and thicknesses of areas in the drawings are arbitrarily illustrated for convenience of explanation. In FIGS. 1, 2 and 3, one of a cathode collector and an anode collector may be referred to as a first collector and the other to as a second collector. One of a cathode structure and an anode structure may be referred to as a first structure and the other to as a second structure.

FIG. 1 is a cross-sectional view of an all solid type 3D battery 100 according to an embodiment.

Referring to FIG. 1, the all solid type 3D battery 100 according to an embodiment may include a cathode collector 10, a cathode structure 12, an electrolyte structure 14, an anode structure 16, and an anode collector 18. Other elements may be further included. The cathode collector 10 and the anode collector 18 may be separated from and face each other. The cathode collector 10 and the anode collector 18 may be arranged in parallel with each other. In an embodiment, the cathode collector 10 may include a collector including aluminum. However, the inventive concept is not limited thereto. The cathode structure 12, the electrolyte structure 14, and the anode structure 16 may be disposed between the cathode collector 10 and the anode collector 18. At least the cathode structure 12 may have a 3D structure. In an embodiment, the cathode structure 12 may include at least two portions which are disposed or extend in directions different from each other in a 3D space, for example. In this case, the at least two portions may be what is materially consecutive, for example, forming a single unitary body. In an embodiment, the cathode structure 12 may include a compound electrode including lithium (Li), for example, a lithium metal oxide electrode. In an embodiment, the lithium metal oxide may be an active material, for example, a lithium cobalt oxide. However, the inventive concept is not limited thereto. The electrolyte structure 14 may be disposed to have a structure corresponding to the cathode structure 12. The anode structure 16 may be disposed to have a structure corresponding to either the cathode structure 12 or the electrolyte structure 14. The electrolyte structure 14 may be disposed between the cathode structure 12 and the anode structure 16. The cathode structure 12 and the anode structure 16 may face each other with the electrolyte structure 14 therebetween and be disposed so that the cathode structure 12 and the anode structure 16 do not contact each other. The anode structure 16 may not be in contact with the cathode collector 10. The cathode structure 12 may not be in contact with the anode collector 18.

The cathode structure 12 may be described as including a horizontal portion 12A and a vertical portion 12B for convenience of description. However, this description does not indicate that the horizontal portion 12A and the vertical portion 12B are structurally separated or materially totally different from each other. The horizontal portion 12A and the vertical portion 12B of the cathode structure 12 may structurally form a single unitary body and also materially a single unitary body. In other words, the horizontal portion 12A and the vertical portion 12B may include the same material and be unitary without a bonding portion. The horizontal portion 12A of the cathode structure 12 may be parallel to the cathode collector 10. The horizontal portion 12A may be in a direct contact with the cathode collector 10. An entire bottom surface of the horizontal portion 12A may be in contact with the cathode collector 10. In an embodiment, a material layer which is helpful for an operation of the all solid type 3D battery 100 may be further included between the horizontal portion 12A and the cathode collector 10. The cathode structure 12 may include a plurality of vertical portions 12B. The plurality of vertical portions 12B may be separated from and parallel to each other. The vertical portion 12B may have a height H1 and a width W1. In addition, the vertical portions 12B may be at distances D1 from one another. Accordingly, an empty space 10S may be defined between the vertical portions 12B. The empty space 10S may be used as a space for accommodating a volume increase of the anode structure 16 which may occur during a battery operation. The width W1 of the vertical portion 12B may be constant through the vertical direction and the distance D1 may be constant through the vertical direction in FIG. 1. The width W1 of the vertical portion 12B may be less than the distance D1. However, a disposition condition of the vertical portion 12B is not limited thereto and may be adjusted in a manufacturing process when needed. The plurality of vertical portions 12B may not be directly connected to each other, but may be connected to each other via the horizontal portion 12A. The plurality of vertical portions 12B may be viewed as protruding portions or extending portions from the horizontal portion 12A toward the anode collector 18.

In FIG. 1, four vertical portions 12B are illustrated only for simplification of the drawing and convenience of description. The all solid type 3D battery 100 may include four vertical portions 12B of the cathode structure 12. However, according to an embodiment, the all solid type 3D battery 100 may include more than four or less than four vertical portions 12B. A surface of the horizontal portion 12A of the cathode structure 12, which faces the cathode collector 10, for example, the entire bottom surface of the horizontal portion 12A, may be in a direct contact with the cathode collector 10.

The electrolyte structure 14 may cover most of a surface of the cathode structure 12. In an embodiment, the surface of the cathode structure 12, except a portion thereof in a direct contact with the cathode collector 10, may be covered by the electrolyte structure 14, for example. In this case, the electrolyte structure 14 may be in a direct contact with the cathode structure 12.

In more detail, entire exposed surfaces of the cathode structure 12 at a state of being attached onto the cathode collector 10 may be covered by and in a direct contact with the electrolyte structure 14. That is, all of an entire inside surface, an entire bottom surface, and an entire top surface of the cathode structure 12 may be covered by the electrolyte structure 14, and all of a first and second side surfaces 12S1 and 12S2 of the vertical portion 12B disposed on the outmost outside of the cathode structure 12 may be covered by the electrolyte structure 14. The first and second side surfaces 12S1 and 12S2 of the vertical portion 12B on the outmost outside of the cathode structure 12 may be respectively connected to both ends of a bottom surface of the cathode structure 12. The electrolyte structure 14 may be in a direct contact with all surfaces covering the cathode structure 12. As a result, all surfaces of the cathode structure 12 may be covered by and in a direct contact with the cathode collector 10 and the electrolyte structure 14. The electrolyte structure 14 which covers all of the first and second side surfaces 12S1 and 12S2 of the vertical portion 12B on the outmost outside of the cathode structure 12 may cover a top surface of the cathode collector 10 surrounding the cathode structure 12. In this case, the electrolyte structure 14 may be in a direct contact with the top surface of the cathode collector 10. The whole of the electrolyte structure 14 may be a solid electrolyte layer. In an alternative embodiment, the electrolyte structure 14 may include an electrolyte layer which is entirely solid. In this respect, the battery 100 may be an all solid type 3D battery. In an embodiment, the solid electrolyte layer may include, for example, a lithium phosphorous oxy-nitride ("LIPON") layer or a $Li_7La_3Zr_2O_{12}$ ("LLZO") layer. However, the inventive concept is not limited thereto. Since the anode structure 16 is disposed along a surface of the electrolyte structure 14, an arrangement form or an entire shape of the anode structure 16 may be similar to the arrangement form of the electrolyte structure 14. The anode structure 16 may cover the whole of the cathode structure 12. The anode structure 16 may cover an entirety of a surface of the electrolyte structure 14 in an area including at least the cathode structure 12, and be in a direct contact with the electrolyte structure 14. The anode structure 16 may include an electrode including a material which accommodates Li ions from the cathode structure 12 at the time of charging. The anode structure 16 may be an electrode which includes Li. In an embodiment, the anode structure 16 may include a Li electrode or a compound electrode including Li, for example. The electrolyte structure 14 and the anode structure 16 may be respectively disposed along surfaces of structures thereunder. Accordingly, the empty space 10S between the vertical portions 12B may not be filled even after the electrolyte structure 14 and the anode structure 16 are provided. In a process of forming the electrolyte structure 14 and the anode structure 16, although the empty space 10S is not fully filled, the empty space 10S may be filled up to an area, for example, dotted lines.

The anode collector 18 may be disposed on the anode structure 16. The anode collector 18 may be in contact with the anode structure 16. The anode collector 18 may be in a direct contact with a top surface of the anode structure 16. The anode collector 18 may cover the whole of the cathode structure 12 and the whole of the empty space 10S. In an embodiment, the anode collector 18 may include a collector including copper, for example. However, the inventive concept is not limited thereto.

The all solid type 3D battery 100 of FIG. 1 may have a structure such that the electrolyte structure 14 covers entirety of surfaces of the first and second side surfaces 12S1 and 12S2 on the outmost outside of the cathode structure 12, and is in a direct contact with the cathode collector 10.

Accordingly, the thinnest portion of the cathode structure 12 between the electrolyte structure 14 and the cathode collector 10 may be in first and second areas 12C and 12D of the cathode structure 12. In other words, areas with the shortest distance on the cathode structure 12 between the electrolyte structure 14 and the cathode collector 10 may be in the first and second areas 12C and 12D of the cathode structure 12. Accordingly, an electrical resistance in the first and second areas 12C and 12D of the cathode structure 12 may be relatively smaller than that in other areas of the cathode structure 12.

At the time of charging of the all solid type 3D battery 100, Li ions and electrons may be generated in the cathode structure 12, and Li ions may be transferred to the anode structure 16 via the electrolyte structure 14. The generated electrons may reach the cathode collector 10 via the cathode structure 12. Electrons generated in the first and second areas 12C and 12D may more easily reach the cathode collector 10 than those generated in other areas of the cathode structure 12, due to a condition described above. Accordingly, even though the cathode structure 12 does not include a conductive material, a conductive path may be immediately provided in the first and second areas 12C and 12D at the time of charging. This may indicate that a charging operation may immediately occur in the first and second areas 12C and 12D at the time of charging. Thus, an initial charging may be smoothly performed. As the conductive path is provided in the first and second areas 12C and 12D of the cathode structure 12 at the time of charging, a conductive area may be provided with the conductive path as a center. Then, the conductive area may propagate to other areas of the cathode structure 12 and as a result, an entirety of the cathode structure 12 may become the conductive area. Arrows in FIG. 1 may show example propagation paths of the conductive area from the first and second areas 12C and 12D to other areas.

FIG. 2 is an all solid type 3D battery 200 according to another embodiment.

Referring to FIG. 2, the all solid type 3D battery 200 may include a cathode collector 20, a cathode structure 22, an electrolyte structure 24, an anode structure 26 and an anode collector 28. In addition, other elements may be further included. The empty space 20S, the cathode structure 22, the electrolyte structure 24, the anode structure 26 and the anode collector 28 may have structures and arrangement forms corresponding to the empty space 10S, the cathode structure 12, the electrolyte structure 14, the anode structure 16 and the anode collector 18 of the all solid type 3D battery 100 of FIG. 1, respectively. Thus, descriptions on the empty space 20S, the cathode structure 22, the electrolyte structure 24, the anode structure 26 and the anode collector 28 will be omitted.

A shape and an arrangement of the cathode collector 20 of the all solid type 3D battery 200 may be different from those of the cathode collector 10 of the all solid type 3D battery 100 of FIG. 1.

In detail, the cathode collector 20 may include a horizontal portion and two pieces of first and second vertical portions 20A and 20B. A structure that the cathode collector 20 includes the horizontal portion and the first and second vertical portions 20A and 20B may not imply that the cathode collector 20 is separated into the horizontal portion and the first and second vertical portions 20A and 20B. As shown in FIG. 2, an entirety of the cathode collector 20 may be a single unitary body including the same material and may not include a physically bonded or connected portion. The cathode collector 20 is divided into the horizontal portion and the first and second vertical portions 20A and 20B simply for convenience of description. The horizontal portion may be parallel to the anode collector 28. The first and second vertical portions 20A and 20B may be parallel to vertical portions of the cathode structure 22. A structure and an arrangement of the horizontal portion of the cathode collector 20 may be the same as those of the cathode collector 10 of the all solid type 3D battery 100 of FIG. 1. The two pieces of the first and second vertical portions 20A and 20B of the cathode collector 20 may be between vertical portions of the cathode structure 22 and the electrolyte structure 24, and in contact with both sides of the cathode structure 22 and the electrolyte structure 24. The first vertical portion 20A may be between an outer side surface of the outmost left vertical portion 22S1 of the cathode structure 22 and the electrolyte structure 24. The first vertical portion 20A may cover an entirety of the outer side surface of the outmost left vertical portion 22S1 of the cathode structure 22. In this case, one side surface of the first vertical portion 20A may be in a direct contact with the entirety of the outer side surface of the outmost left vertical portion 22S1, and an entirety of the other side surface of the first vertical portion 20A may be in contact with the electrolyte structure 24. The first vertical portion 20A may cover a portion or an entirety of the outer side surface of the outmost left vertical portion 22S1 of the cathode structure 22 and be in contact with the electrolyte structure 24. The second vertical portion 20B of the cathode collector 20 may be between the outer side surface of the outmost right vertical portion 22S2 of the cathode structure 22 and the electrolyte structure 24. In this case, the second vertical portion 20B may cover the entirety of the outer side surface of the outmost right vertical portion 22S2 of the cathode structure 22. An entirety of one side surface of the second vertical portion 20B may be in a direct contact with the entirety of the outer side surface of the outmost right vertical portion 22S2 of the cathode structure 22. An entirety of the other side surface of the second vertical portion 20B may be in contact with the electrolyte structure 24. The second vertical portion 20B may cover a portion of the outer side surface of the outmost right vertical portion 22S2 of the cathode structure 22 and be in contact with the cathode structure 22.

In the cathode structure 22 of the all solid type 3D battery 200 of FIG. 2, areas corresponding to the first and second areas 12C and 12D of the cathode structure 12 of the all solid type 3D battery 100 of FIG. 1 may be the first and second areas 22A and 22B. Accordingly, at the time of charging of the all solid type 3D battery 200, a conductive area may be initially generated in the first and second areas 22A and 22B of the cathode structure 22, and thereafter, may propagate to the entire area of the cathode structure 22. Arrows in FIG. 2 may show an example of a process of propagation of the conductive area.

In another embodiment, the all solid type 3D battery 200 of FIG. 2 may include only one of the first and second vertical portions 20A and 20B of the cathode collector 20. In the another embodiment, only the first vertical portion 20A may be included in the all solid type 3D battery 200 and the conductive area may start from the first area 22A at the time of charging of the all solid type 3D battery 20, for example.

FIG. 3 illustrates an all solid type 3D battery 300 according to another embodiment.

Referring to FIG. 3, the all solid type 3D battery 300 may include a cathode collector 30, a cathode structure 32, an electrolyte structure 34, an anode structure 36 and an anode collector 38. In addition, other elements may be further included. The cathode collector 30, the cathode structure 32, electrolyte structure 34 and the anode structure 36 may have structures and arrangement forms corresponding to the cathode collector 10, the cathode structure 12, the electrolyte structure 14 and the anode structure 16 of the all solid type 3D battery 100 of FIG. 1, respectively. Accordingly, descriptions on the cathode collector 30, the cathode structure 32, the electrolyte structure 34 and the anode structure 36 will be omitted.

A shape and an arrangement of the anode collector 38 of the all solid type 3D battery 300 may be different from those of the anode collector 18 of the all solid type 3D battery 100 of FIG. 1.

In detail, the anode collector 38 may be disposed on the anode structure 36 and cover the cathode structure 32 and the electrolyte structure 34. The anode collector 38 may be in contact with a top surface of the anode structure 36. In addition, the anode collector 38 may extend to the empty space 10S in FIG. 1 and cover an entirety of a surface of the anode structure 36 between vertical portions of the cathode structure 32. In the described shape, a portion of the anode structure 36 covered by the anode collector 38 may be in a direct contact with the anode collector 38. The anode collector 38 may morphologically have a shape provided along the surface of the anode structure 36. Accordingly, the anode collector 38 may have the same surface shape as that of the anode structure 36.

In the all solid type 3D battery 300 of FIG. 3, arrangements and shapes of the cathode collector 30, the cathode structure 32, the electrolyte structure 34 and the anode structure 36 may be the same as those of the cathode collector 10, the cathode structure 12, the electrolyte structure 14, and the anode structure 16, respectively. Accordingly, locations of forming areas and an extending manner of the conductive area of the all solid type 3D battery 300 of FIG. 3, at the time of charging of the all solid type 3D battery 300, may be the same as those described above for the all solid type 3D battery 100 of FIG. 1.

Next, a method of manufacturing an all solid type 3D battery according to an embodiment will be described step-by-step with reference to FIGS. 4 through 12.

Figure 4:
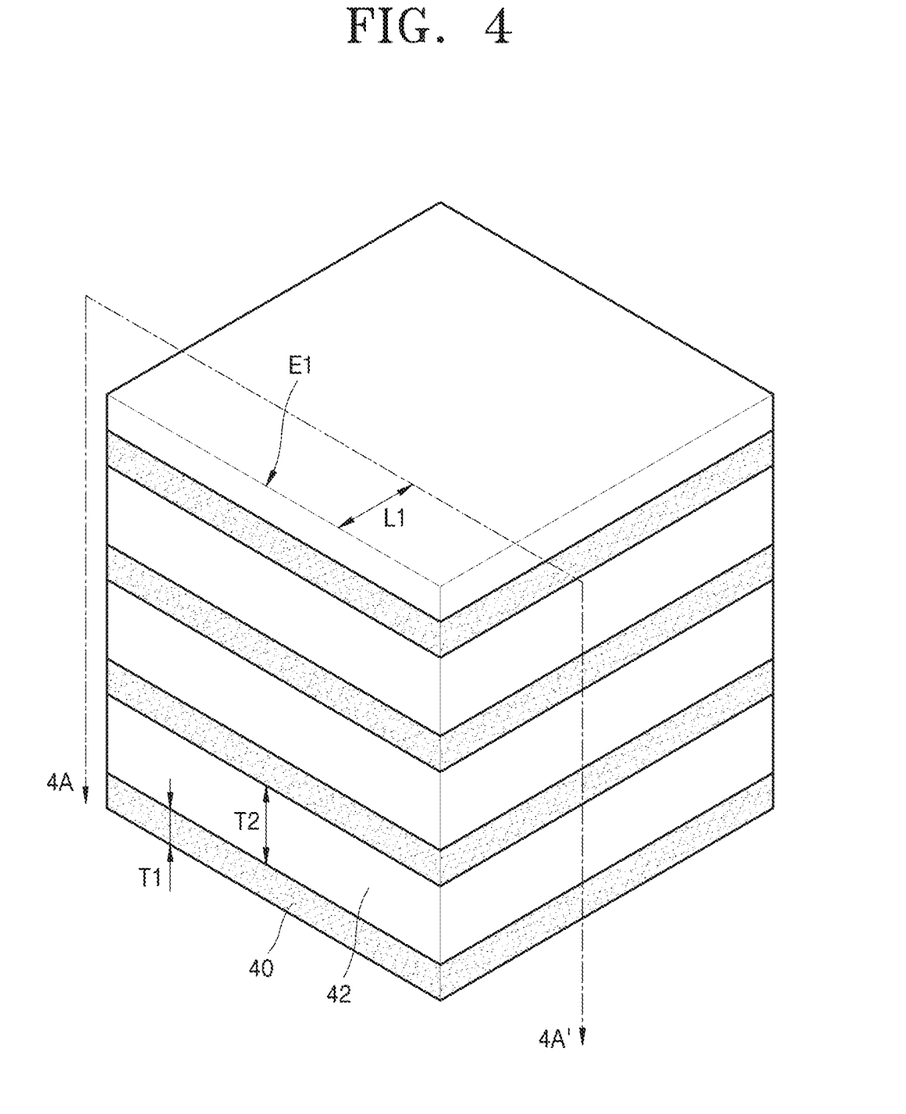
FIGS. 4 through 12 are perspective and cross-sectional views illustrating an embodiment of a method of manufacturing an all solid type 3D battery.

Firstly, as illustrated in FIG. 4, a cathode material layer 40 and a sacrificial material layer 42 may be alternately laminated. The sacrificial material layer 42 may be provided as the outmost top side layer. In an embodiment, the cathode material layer 40 and the sacrificial material layer 42 may be provided via, for example, a tape casting method. The cathode material layer 40 may correspond to respective cathode structures 12, 22, and 32 which are described in FIGS. 1 through 3. The number of times the cathode material layer 40 and the sacrificial material layer 42 are alternately laminated may be determined based on the number of horizontal portions included in the cathode structures 12, 22, and 32 of all solid type 3D batteries 100, 200, and 300, respectively. In an embodiment, as illustrated in FIGS. 1 through 3, when the number of the horizontal portions of the cathode structures 12, 22, and 32 is four, the number of times of the alternate lamination of the cathode material layer 40 and the sacrificial material layer 42 may be four, for example. The cathode material layer 40 may be provided to have a first thickness T1. The first thickness T1 of the cathode material layer 40 may correspond to the width W1 of the vertical portion 12B of the cathode structure 12 of the all solid type 3D battery 100 illustrated in FIG. 1, and may be the same as the width W1. The width W1 of the vertical portion of the cathode structures 12, 22, and 32 illustrated in FIGS. 1 through 3 may be determined via the first thickness T1 of the cathode material layer 40. The sacrificial material layer 42 may be provided to have a second thickness T2. In an embodiment, the second thickness T2 may be greater than the first thickness T1. However, the inventive concept is not limited thereto. The sacrificial material layer 42 may maintain the distance between the cathode material layers 40. Thus, the second thickness T2 of the sacrificial material layer 42 may correspond to the distance D1 between the horizontal portions 12B of the cathode structure 12 of the all solid type 3D battery 100 illustrated in FIG. 1.

The cathode material layer 40 may include a cathode active material and a polymer binder. The cathode active material may be included in a shape of powder. In an embodiment, the cathode active material may include a compound including Li, for example, a Li metal oxide. In the embodiment, the Li metal oxide may include, for example, a lithium cobalt oxide or other various known Li metal oxides. In an embodiment, the polymer binder in the cathode material layer 40 may have a volume fraction of about 20% to about 50%, for example. The polymer binder included in the cathode material layer 40 may be burnt and disappear in a subsequent sintering process. Accordingly, after the sintering process, an entirety of the cathode material layer 40 may be a cathode active material layer. The sacrificial material layer 42 may be a material which is removed in the subsequent sintering process. The sacrificial material layer 42 may be a material which volatilizes or is burnt in the subsequent sintering process. In an embodiment, the sacrificial material layer 42 may include a graphite powder and the polymer binder. In an embodiment, the polymer binder in the sacrificial material layer 42 may have a volume fraction of about 20% to about 50%, for example.

After the cathode material layer 40 and the sacrificial material layer 42 are alternately laminated, an alternately laminated layer structure may be cut along the 4A-4A' direction. In this case, a cutting location may be at a first length L1 in a direction away from an edge E1 of one side of the sacrificial material layer 42 at the outmost top side layer. The first length L1 may correspond to the height H1 of the vertical portion 12B of the cathode structure 12 of the all solid type 3D battery 100 of FIG. 1. After the cutting has been performed, a portion corresponding to the first length L1 may be used. Hereinafter, the portion used after cutting the alternately laminated layer structure will be referred to as "a compound laminated body".

Figure 5:
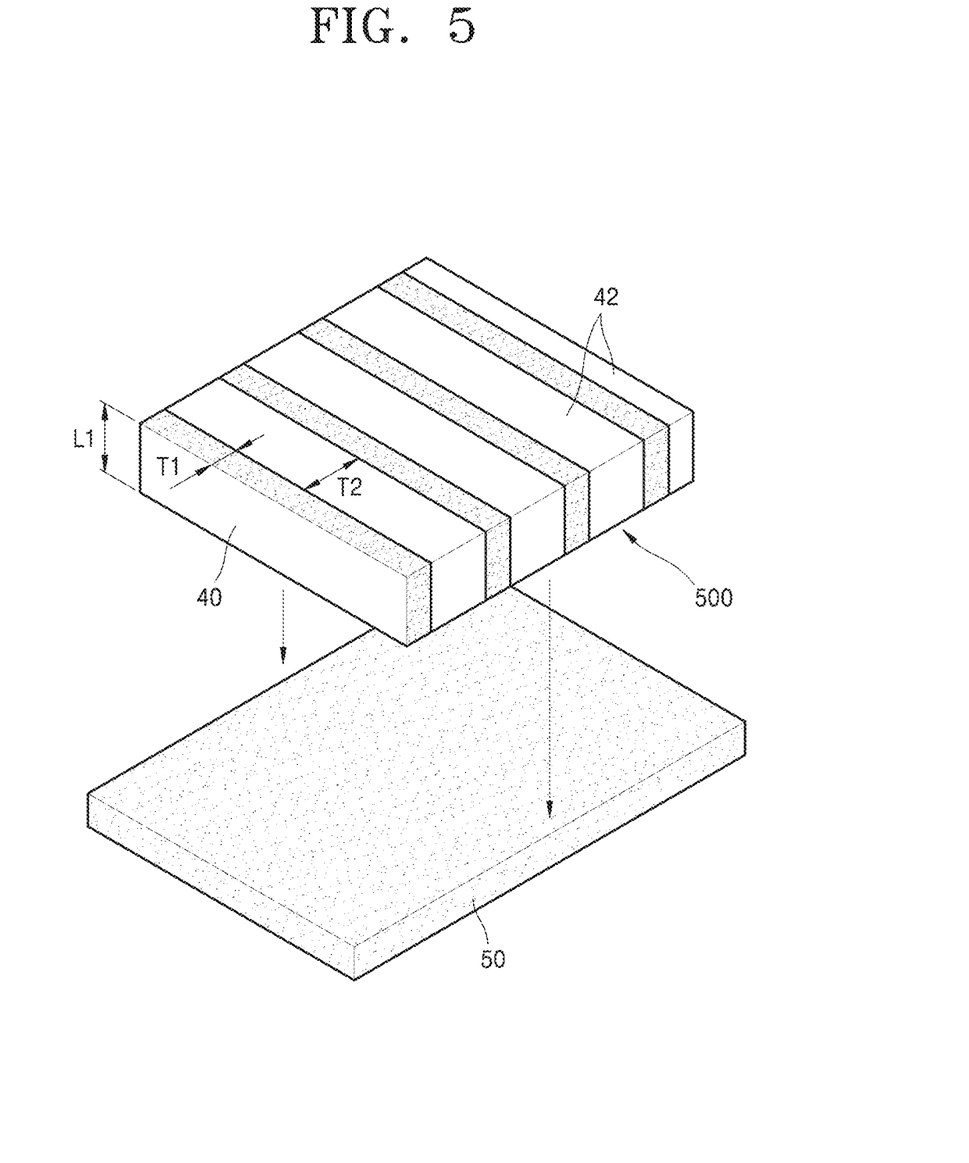

Next, as illustrated in FIG. 5, the compound laminated body 500 may be attached onto a second cathode material layer 50. The second cathode material layer 50 may be physically the same as the cathode material layer 40 (refer to FIG. 4). An area of a top surface of the second cathode material layer 50 may be equal to or larger than that of a bottom side surface of the compound laminated body 500 facing the second cathode material layer 50. The second cathode material layer 50 may correspond to the horizontal portion of the cathode structures 12, 22, and 32 of the 3D batteries 100, 200, and 300 of FIGS. 1 through 3, respectively. An attachment of the compound laminated body 500 and the second cathode material layer 50 may be performed by applying a pressure onto a contact interface between the compound laminated body 500 and the second cathode material layer 50 in a direction perpendicular to the top surface of the second cathode material layer 50 while the compound laminated body 500 is in contact with the top surface of the second cathode material layer 50. In an embodiment, the compound laminated body 500 may be attached to the second cathode material layer 50 by applying a pressure onto the compound laminated body 500 while the compound laminated body 500 is in contact with the top surface of the second cathode material layer 50, for example. An attachment structure where the compound laminated body 500 and the second cathode material layer 50 are attached to each other is illustrated in FIG. 6.

Figure 6:
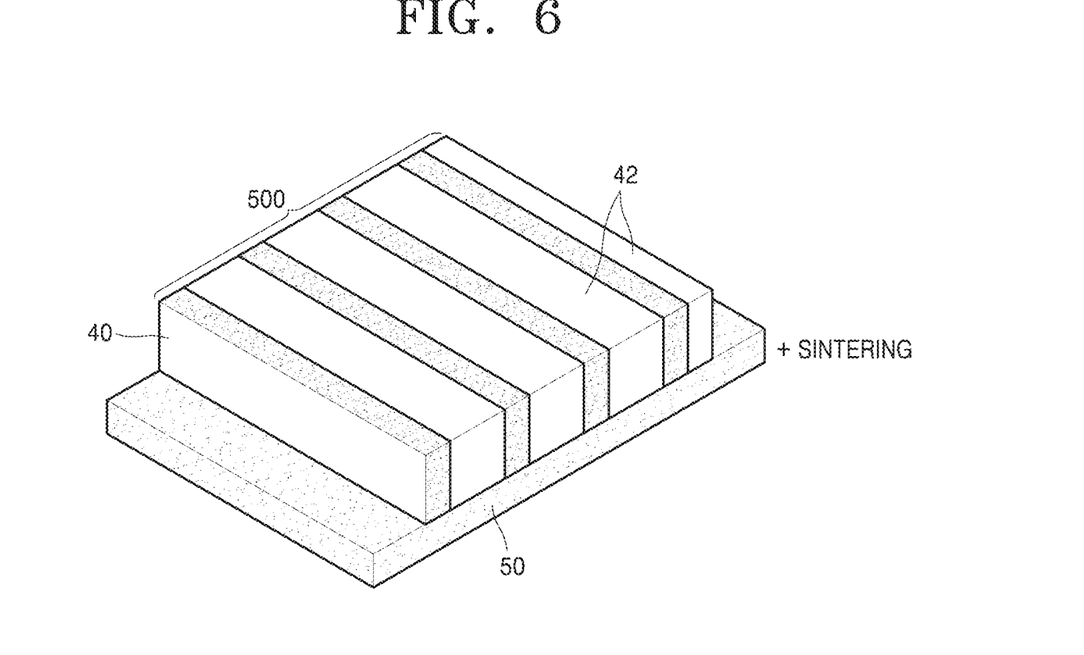

Next, as illustrated in FIG. 6, the sintering process will be performed to the attachment structure where the compound laminated body 500 and the second cathode material layer 50 are attached to each other. The sintering process may be performed at a certain temperature and for a certain period of time, after the attachment structure where the compound laminated body 500 and the second cathode material layer 50 are attached to each other has been loaded in a furnace. In an embodiment, the certain temperature may be, for example, about 850 degrees Celsius (° C.) to about 1050° C. and may be properly adjusted in the described temperature range. In an embodiment, the certain period of time may be, for example, about 2 hours (h) to about 24 h and may be properly adjusted in the described time range.

The sintering process may be performed until a degree of sintering of cathode material layer 40 of the compound laminated body 500 and that of the second cathode material layer 50 reach a certain level. In an embodiment, the sintering process may be performed until the cathode material layer 40 of the compound laminated body 500 and the second cathode material layer 50 become a single unitary body such that a physically joined portion or a physically attached boundary therebetween does not exist (disappear), for example. In an embodiment, the sintering process may be performed until the degree of sintering of the cathode material layer 40 and the second cathode material layer 50 become equal to or greater than about 80%, for example.

The sacrificial material layer 42 included in the compound laminated body 500 may be burnt and disappear in the sintering process. In addition, the polymer binder included in the cathode material layer 40 and the second cathode material layer 50 may be burnt and disappear in the sintering process. Accordingly, the entirety of the cathode material layer 40 and the second cathode material layer 50 may be the cathode active material layer after the sintering process.

Figure 7:
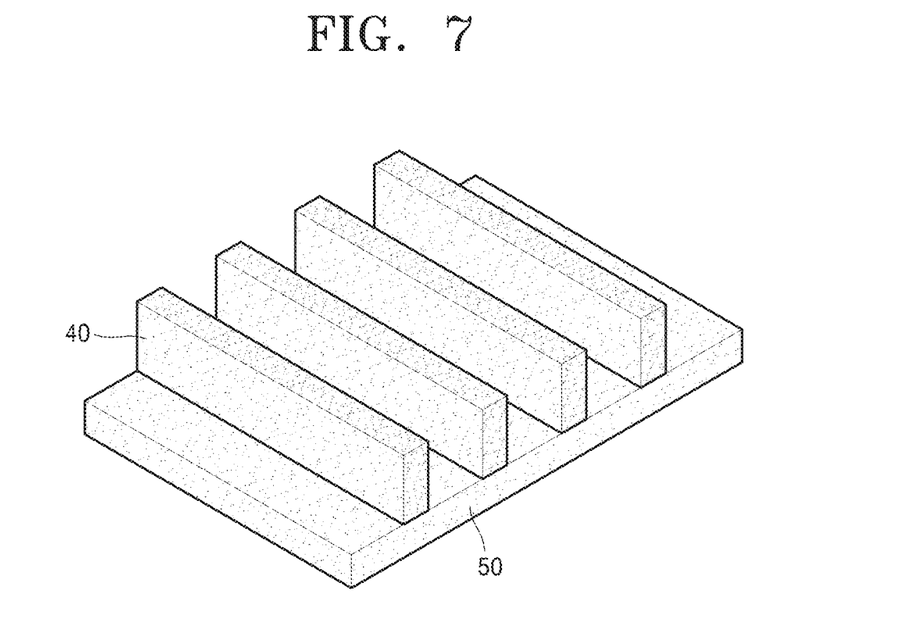

After the sintering process is complete, as illustrated in FIG. 7, a plurality of cathode material layers 40 may extend in a direction perpendicular to the top surface of the second cathode material layer 50. The plurality of cathode material layers 40 may be separated from each other with predetermined distances and no other material may be included on the second cathode material layer 50 between the plurality of cathode material layers 40.

Figure 8:
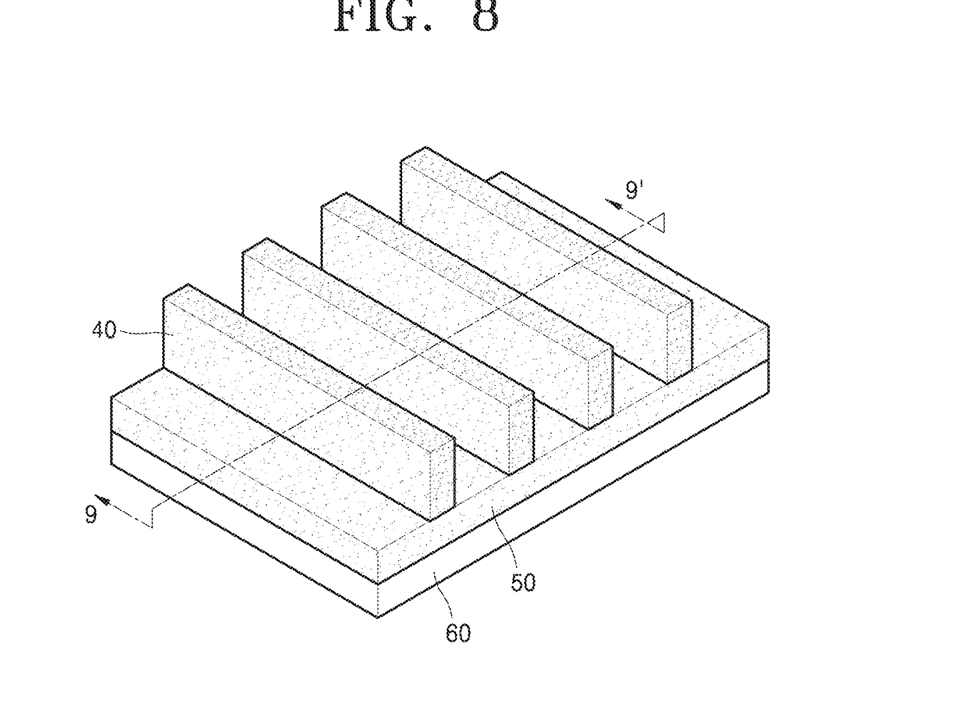

After the sintering process is complete, as illustrated in FIG. 8, a cathode collector 60 may be attached to the bottom side surface of the second cathode material layer 50. In an embodiment, the cathode collector 60 may include, for example, aluminum. However, the inventive concept is not limited thereto.

Figure 9:
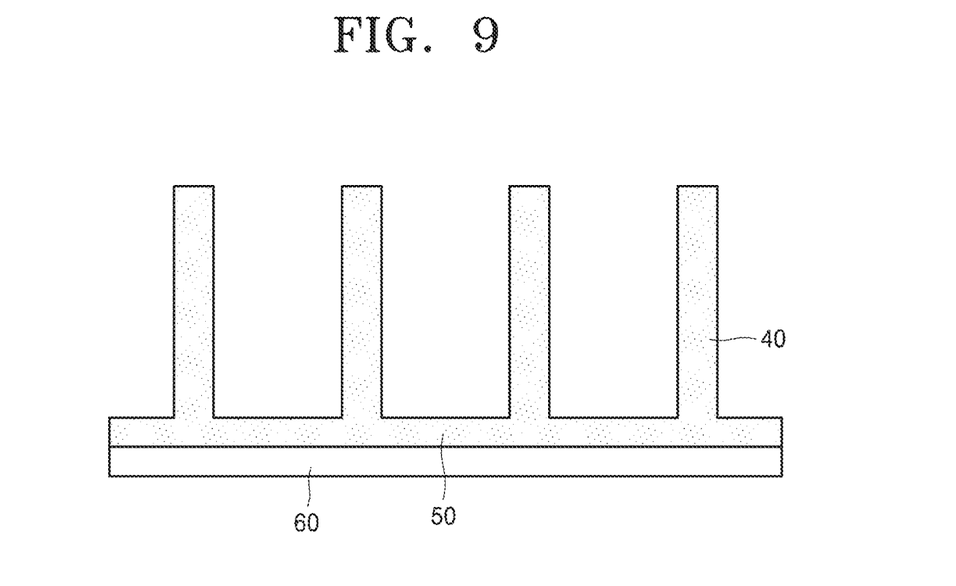

FIG. 9 illustrates a cross-sectional view of FIG. 8, cut along line 9-9'. Descriptions below will be based on the cross-section of FIG. 9.

Referring to FIG. 9, the entirety of the bottom side surface of the second cathode material layer 50 may be in contact with the cathode collector 60. In addition, the cathode material layer 40 and the second cathode material layer 50 may be viewed as a single unitary body without physically joined portions or physically attached boundaries.

Figure 10:
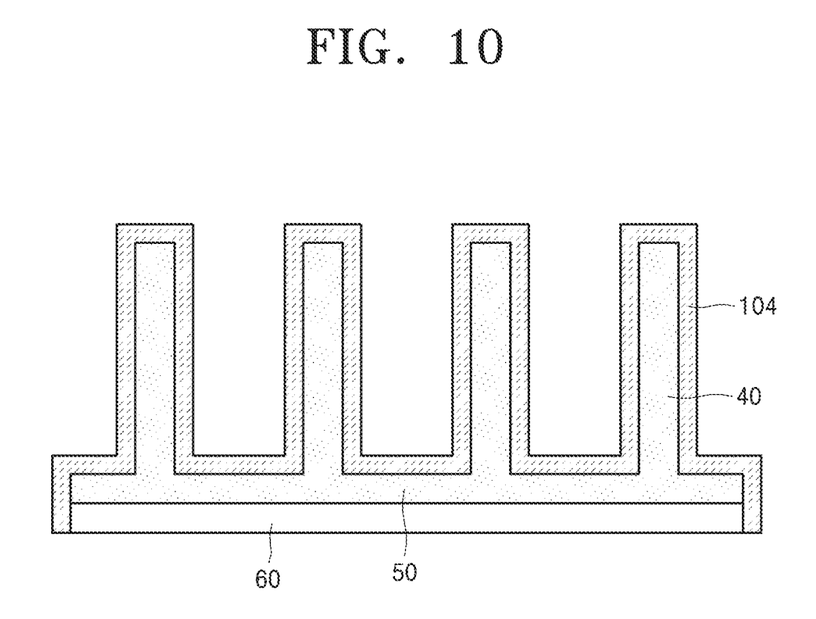

Next, as illustrated in FIG. 10, an electrolyte layer 104 which covers the cathode material layer 40 and the second cathode material layer 50 may be disposed on the cathode collector 60. The entirety of the electrolyte layer 104 may be a solid layer. In an embodiment, the electrolyte layer 104 may be formed via various methods, for example, a chemical vapor deposition ("CVD") method or a sputtering method. The electrolyte layer 104 may correspond to respective electrolyte structures 14, 24, and 34 illustrated in FIGS. 1 through 3. The electrolyte layer 104 may cover and be in contact with an entire exposed surface of the cathode material layer 40, that is, the entire exposed surface to be used for the battery operation. In addition, the electrolyte layer 104 may cover and be in contact with the entire exposed surface of the second cathode material layer 50, that is, the entire exposed surface to be used for the battery operation (the entire top surface and the entire side surface). The electrolyte layer 104 may cover and be in contact with the side surface of the cathode collector 60. In an embodiment, the electrolyte layer 104 may include an LIPON layer, an LLZO layer, a $Li_{1.3}Al_{0.3}Ti_{1.7}(PO_4)_3$ ("LATP") layer or a $Li_{1+x}Ge_{2-y}Al_yP_3O_{12}$ ("LAGP") layer, for example.

Figure 11:
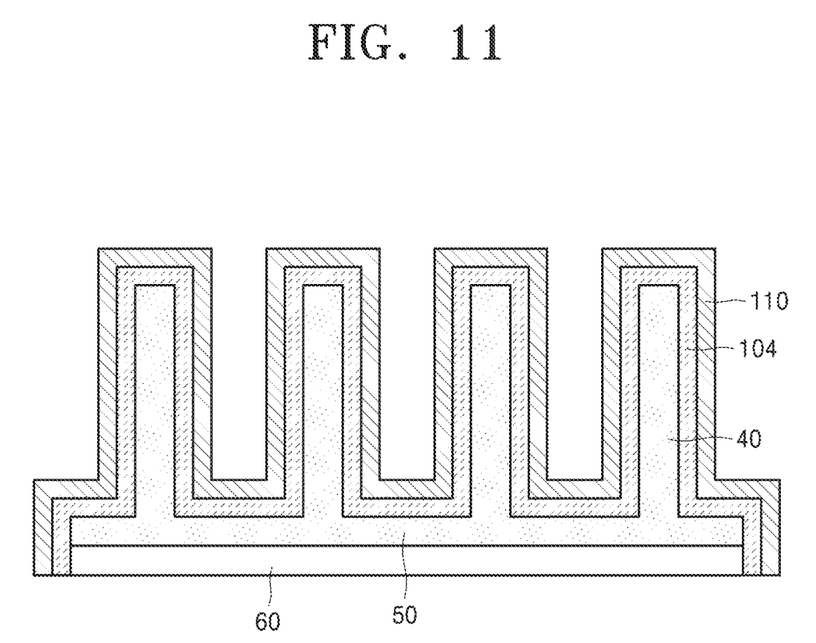

Next, as illustrated in FIG. 11, an anode material layer 110 which covers the cathode collector 60, the cathode material layer 40, the second cathode material layer 50 and the electrolyte layer 104 may be disposed on the electrolyte layer 104. The anode material layer 110 may cover an entire exposed surface of the electrolyte layer 104 with a condition of no contact with the cathode collector 60. In an embodiment, the anode material layer 110 may cover and be in contact with the entire top surface and the entire side surface of the electrolyte layer 104, and the entire flat surface (or the entire horizontal surface) surrounding the cathode material layer 40, for example. The anode material layer 110 may be provided via various methods. In an embodiment, the anode material layer 110 may be provided via a CVD method or the sputtering method, for example. The anode material layer 110 may include a Li layer or a compound material layer including Li.

Figure 12:
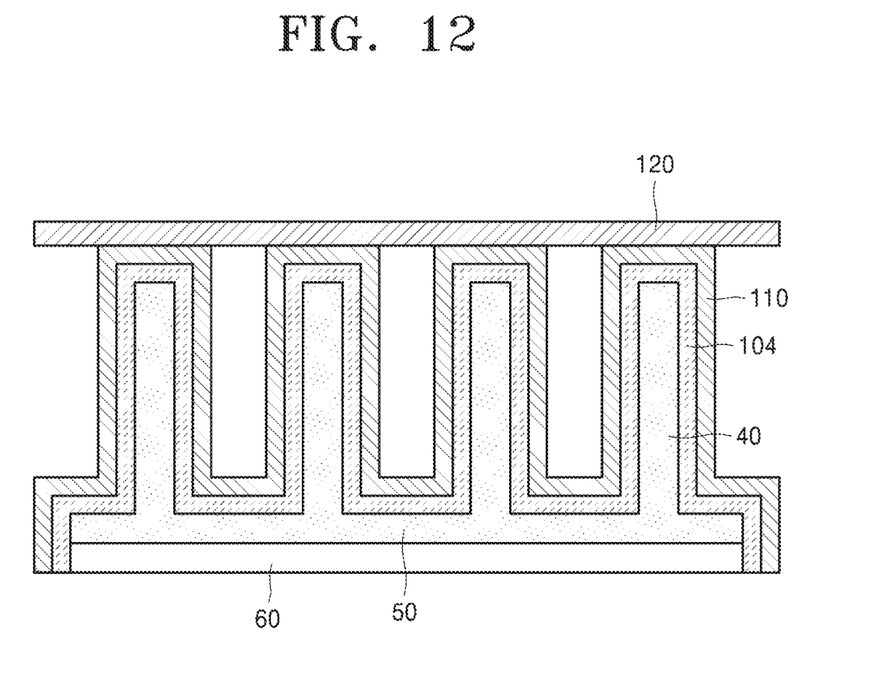

Next, an anode collector 120 may be disposed on the anode material layer 110. In an embodiment, as illustrated in FIG. 12, the anode collector 120 may be attached onto the top surface of the anode material layer 110 parallel to the cathode collector 60, for example. In this case, the anode collector 120 may be forced to be in contact with the entire top surface of the anode material layer 110 parallel to the cathode collector 60 and then, be attached onto the entire top surface of the anode material layer 110 by applying a certain pressure. In the case of FIG. 12, after the anode collector 120 is attached, a space corresponding to the empty space 10S in FIG. 1 may be defined between the bottom side surface of the anode collector 120 and the cathode material layer 40. The anode collector 120 may include, for example, copper, but may also include metals other than copper.

According to an embodiment, the anode collector 120 may be disposed along a surface of the anode material layer 110, like the anode collector 38 illustrated in FIG. 3.

As described above, in the all solid type 3D battery of the present inventive concept, the entirety of the electrolyte structure or the electrolyte layer may be a solid material layer. In the all solid type 3D battery, the electrolyte structure may be in contact with the side surface of the cathode structure (or the cathode material layer) and more particularly, a portion or the entirety of the outmost side surfaces of the cathode structure (or the cathode material layer). In addition, the electrolyte structure may have a structure where the electrolyte structure is in contact with the cathode collector. In addition, the entire bottom side surface of the cathode structure may be in contact with the cathode collector.

The all solid type 3D battery disclosed in the inventive concept may have a structure where the entire surface to be used for the battery operation as well as the entire bottom side surface of the cathode structure may be covered by the cathode collector and the electrolyte structure, and be in contact with materials thereof. Accordingly, a portion having the smallest thickness of the cathode structure between the electrolyte structure and the cathode collector or a portion, having the shortest distance between the electrolyte structure and the cathode collector, of the cathode structure may become the corner of the cathode structure. Thus, the electrical resistance at the corner of the cathode structure may be relatively smaller than that of other areas of the cathode structure. Accordingly, electrons generated at the corner of the cathode structure at the time of charging may more easily reach the cathode collector than electrons generated in other areas of the cathode structure.

As a result described above, the conductive path may be immediately disposed at the corner of the cathode structure at the time of charging, even though the cathode structure does not include the conductive material. The result may imply that a charging operation is promptly performed at the corner of the cathode structure at the time of charging, the initial charging is smoothly proceeded, and thus, a charging time is reduced.

It should be understood that embodiments described herein should be considered in a descriptive sense only and not for purposes of limitation. Descriptions of features within each embodiment should typically be considered as available for other similar features or other embodiments.

While one or more embodiments have been described with reference to the drawings, it will be understood by those of ordinary skill in the art that various changes in form and details may be made therein without departing from the spirit and scope as defined by the following claims.

What is claimed is:

1. An all solid type three-dimensional battery comprising:
   a first collector;
   a first structure in contact with the first collector;
   an electrolyte structure in contact with the first structure;
   a second structure in contact with the electrolyte structure, the second structure separated from the first structure and the first collector; and
   a second collector in contact with a portion of an upper surface of the second structure,
   wherein a remaining portion of the upper surface of the second structure and the second collector are spaced apart from each other in a direction perpendicular to a plane extension direction of the second collector,
   wherein the second structure has a plurality of first upper surfaces and a plurality of second upper surfaces separated from the plurality of first upper surfaces, and height of the first upper surfaces is different from height of the second upper surfaces, and
   wherein the first upper surfaces and the second upper surfaces are in a direction perpendicular to the first collector.

2. The all solid type three-dimensional battery of claim 1, wherein a portion of the first collector is in contact with a portion of a side surface of the first structure.

3. The all solid type three-dimensional battery of claim 1, wherein a portion of the first collector is in contact with a portion of one side surface of outmost side surfaces of the first structure.

4. The all solid type three-dimensional battery of claim 1, wherein a portion of the first collector is in contact with an entirety of a side surface of outmost side surfaces of the first structure.

5. The all solid type three-dimensional battery of claim 2, wherein the portion of the first collector is in contact with a portion of each of outmost side surfaces of the first structure.

6. The all solid type three-dimensional battery of claim 2, wherein the portion of the first collector is in contact with an entirety of each of outmost side surfaces of the first structure.

7. The all solid type three-dimensional battery of claim 1, wherein the first structure comprises a portion parallel to the first collector and a portion perpendicular to the first collector.

8. The all solid type three-dimensional battery of claim 1, wherein the second collector is parallel to the first collector and in contact with an entirety of a top surface of the second structure.

9. The all solid type three-dimensional battery of claim 1, wherein the second collector comprises a portion parallel to the first collector and a portion perpendicular to the first collector.

10. The all solid type three-dimensional battery of claim 1, wherein an entirety of a surface of the first structure which is used for a battery operation is in contact with the first collector and the electrolyte structure.

* * * * *